(No Model.) 3 Sheets—Sheet 1.
M. S. FIELD.
FANNING MILL.
No. 300,456. Patented June 17, 1884.
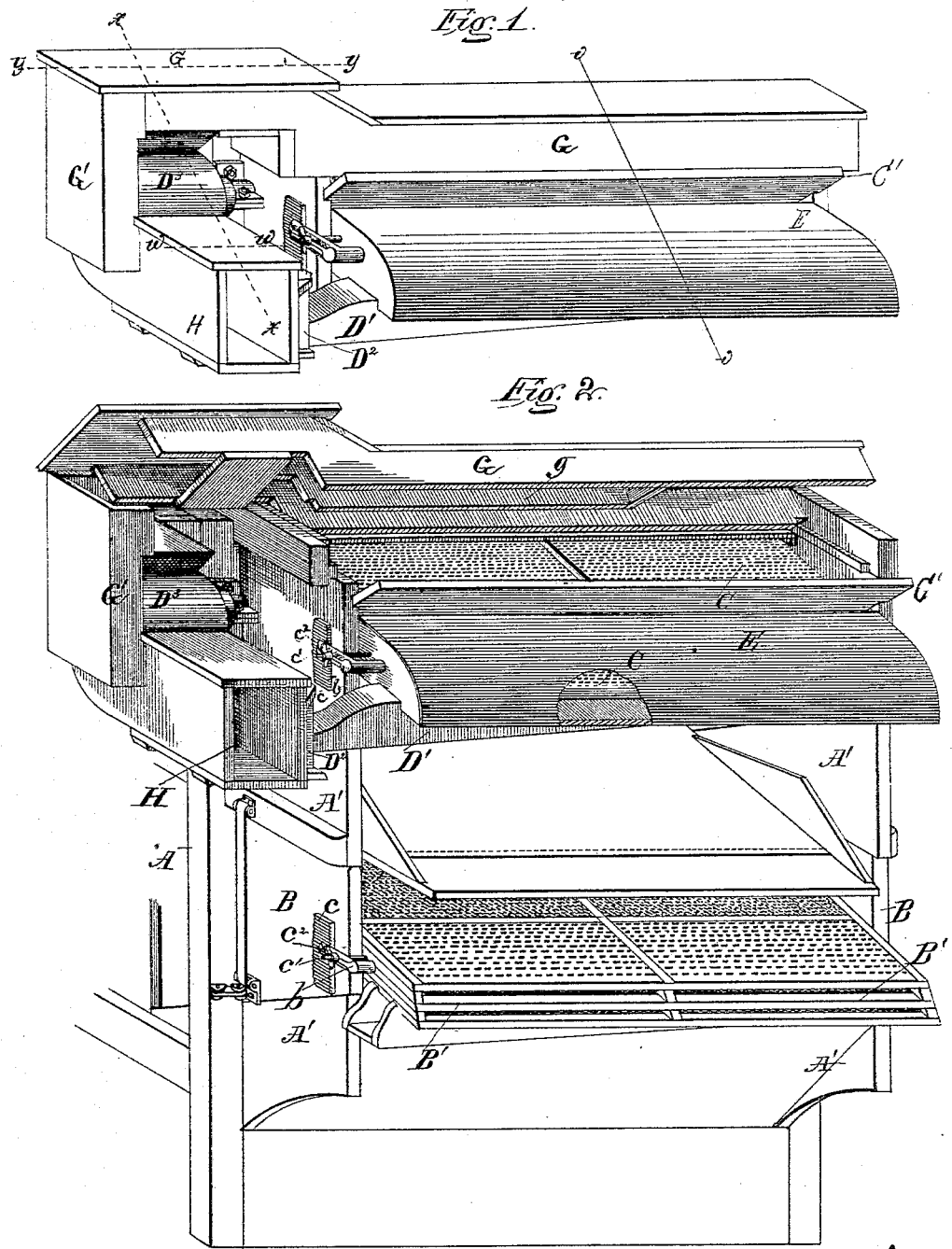
Witnesses:
Inventor:
Martin S. Field
by Fint & Underwood
Attorneys.

(No Model.)   3 Sheets—Sheet 2.
M. S. FIELD.
FANNING MILL.
No. 300,456.   Patented June 17, 1884.
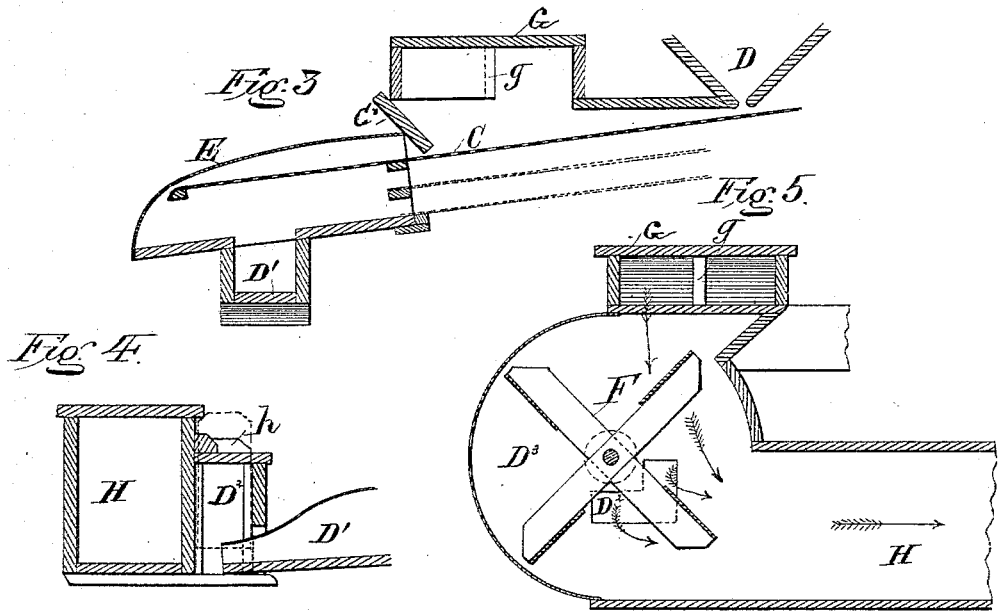
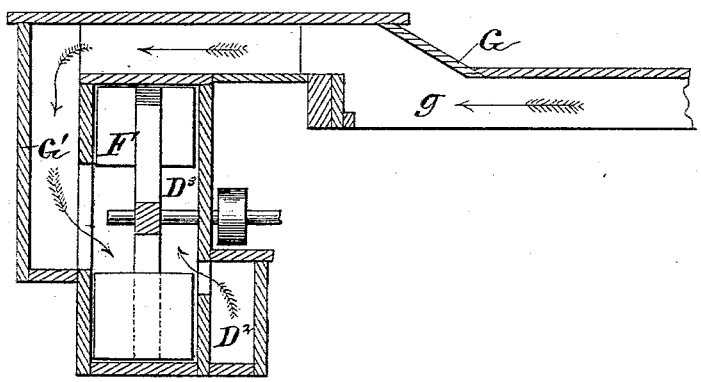

(No Model.) 3 Sheets—Sheet 3.
M. S. FIELD.
FANNING MILL.
No. 300,456. Patented June 17, 1884.
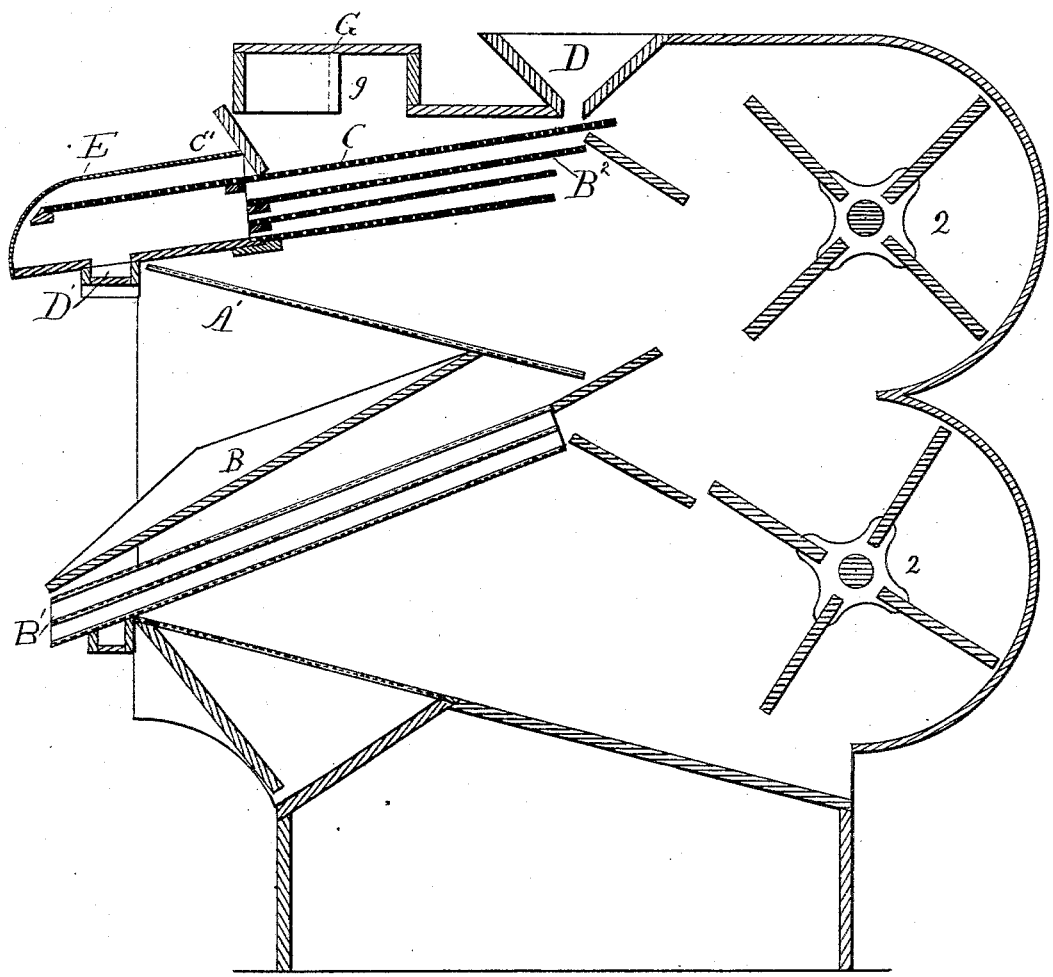
Witnesses:
E. J. Asmus
C. N. Brown
Inventor.
Martin S. Field
by Stout & Underwood
Attorneys.

UNITED STATES PATENT OFFICE.

MARTIN S. FIELD, OF RACINE, WISCONSIN, ASSIGNOR TO JOHNSON & FIELD, OF SAME PLACE.

FANNING-MILL.

SPECIFICATION forming part of Letters Patent No. 300,456, dated June 17, 1884.

Application filed June 26, 1883. (No model.)

*To all whom it may concern:*

Be it known that I, MARTIN S. FIELD, of Racine, in the county of Racine, and in the State of Wisconsin, have invented certain new and useful Improvements in Fanning-Mills; and I do hereby declare that the following is a full, clear, and exact description thereof.

My invention relates to fanning-mills, and will be fully described hereinafter, and the features of novelty which I claim will be set forth in the claim.

In the drawings, Figure 1 is a rear view of the upper portion of a fanning-mill. Fig. 2 is a like view of a mill with the upper portion or cover lifted to expose the interior. Fig. 3 is a section on line $v\ v$, Fig. 1. Fig. 4 is a section on line $w\ w$, Fig. 1. Fig. 5 is a section on line $x\ x$, and Fig. 6 a section on line $y\ y$, Fig. 1. Fig. 7 is a central longitudinal section of the fanning-mill.

A is the supporting-frame of the fanning-mill. A' A' are the side pieces, and B is the shoe that carries the lower nest of screens, B'. From each end of this nest of screens I project a bracket, $b$, the outer end of which engages with a serrated plate, $c$, which is secured to the side of the shoe, and a screw-bolt, $c'$, extending out from that side of the nest of screens, passes through the arm of the bracket to receive a nut, $c^2$. By screwing up the nut this arm of the bracket may be tightened upon the serrated plate, to secure the nest of screens when adjusted to the required inclination. The upper nest of screens, $B^2$, is adjusted in a like manner, the bracket being attached to the nest of screens or to the hood which supports them. Above the upper nest of screens I secure a screen, C, that extends from some distance in front of hopper D out into a hood, E, the floor of which is channeled, to form a trough or spout, D', that leads into a draft-way, $D^2$, and this draftway opens into the drum $D^3$ of a fan, F. An inclined plate, C', permits the dust and fine seeds to pass along the screen toward its outer edge, but prevents the passage of grain by reason of its proximity to the screen.

G is a rectangular hood, which is placed over screen C at a point about midway of its width. This hood also extends out over and beyond the fan-drum $D^3$, and forms a trough or passage that leads from the screen-chamber into the fan-drum through a wind-box, G', and to equalize the draft over the surface of screen C I make a partition, $g$, in the hood G.

I provide the mill with an ordinary fan or fans, 2 2, to produce the circulation required while the fan F is doing its work as an exhaust-fan. H is the dust-spout, which may lead to any suitable dust-receptacle.

To regulate the draft I provide the draft-way $D^2$ with an opening on its side or end and cover it by a sliding gate, $h$, so that by opening the gate air may be admitted from outside the draftway when the draft increases to such an extent as to be liable to draw the grain into the fan-drum.

The operation of my device is as follows: The fan F is driven by the same power that drives the main and ordinary fan and operates the shoes, which latter are constantly agitated while the grain is being admitted to the screens, and as the grain falls over the upper screens the fan F will entirely rid it of dust.

The hood G is merely fitted in place, and therefore may be easily removed to give access to the interior of the machine.

Having thus fully described my invention, what I claim as new, and desire to secure by Letters Patent, is—

In a fanning-mill, a broad screen extending out at the side thereof, a plate extending nearly into contact with the same, so as to permit the passage of fine particles, but prevent the passage of grain, a hood over said screen, an exhaust-trough under the screen leading to a fan, and an exhaust-fan, all combined and relatively arranged as stated.

In testimony that I claim the foregoing I have hereunto set my hand, on this 1st day of May, 1883, in the presence of two witnesses.

MARTIN S. FIELD.

Witnesses:
   H. G. UNDERWOOD,
   M. KAUMHEIMER.